United States Patent [19]

Staley et al.

[11] Patent Number: 5,503,771
[45] Date of Patent: Apr. 2, 1996

[54] PROCESS FOR SUSUPENSION OF CERAMIC OR METAL PARTICLES USING BIOLOGICALLY PRODUCED POLYMERS

[75] Inventors: James T. Staley, Seattle; Ilhan A. Aksay, Bellevue; Gordon L. Graff, Kennewick; Nancy B. Pellerin; Tao Ren, both of Seattle, all of Wash.

[73] Assignee: Washington Technology Center, Seattle, Wash.

[21] Appl. No.: 189,278

[22] Filed: Jan. 27, 1994

Related U.S. Application Data

[63] Continuation of Ser. No. 699,970, May 14, 1991, abandoned.

[51] Int. Cl.$^6$ .............................. B01J 13/00; C03C 1/02
[52] U.S. Cl. ..................... 252/313.1; 252/315.01; 252/315.3; 252/315.4; 501/12; 106/162; 106/209; 75/252
[58] Field of Search .............................. 252/311, 313.1, 252/315.01, 315.3, 315.4; 501/12; 106/162, 205, 209; 419/40, 65; 75/255, 252

[56] References Cited

U.S. PATENT DOCUMENTS

| | | | |
|---|---|---|---|
| 2,990,292 | 6/1961 | Rempes | 427/133 |
| 3,146,113 | 8/1964 | Middleton et al. | 106/209 X |
| 3,216,841 | 11/1965 | Thellmann | 106/209 X |
| 4,063,856 | 12/1977 | Dziedzic | 425/5 |
| 4,298,383 | 11/1981 | Joyce | 419/36 |
| 4,356,095 | 10/1982 | Leavitt | 252/8.55 D |
| 4,574,063 | 3/1986 | Scherer | 501/12 X |
| 4,621,936 | 11/1986 | Hansson et al. | 501/103 X |
| 4,734,237 | 3/1988 | Fanelli et al. | 264/122 |
| 4,735,734 | 4/1988 | Staub et al. | 252/29 |
| 4,755,494 | 7/1988 | Ruben | 501/148 |
| 4,810,295 | 3/1989 | Yagi et al. | 106/209 |
| 4,816,182 | 3/1989 | Novich et al. | 252/313.1 |
| 4,904,411 | 2/1990 | Novich et al. | 252/309 |
| 4,912,069 | 3/1990 | Ruben | 501/148 |
| 5,087,595 | 2/1992 | Marsh et al. | 501/105 |
| 5,248,712 | 9/1993 | Takeuchi et al. | 524/56 |
| 5,250,251 | 10/1993 | Fanelli et al. | 264/328.2 |
| 5,286,767 | 2/1994 | Rohrbach et al. | 524/27 |

OTHER PUBLICATIONS

G. L. Graff et al., *Processing of Ceramic Suspensions with Biopolymers*, ACS International Conference Colloid and Surface Science, Seattle, Poster Presentation (1989).

Kelco Division of Merck & Co., Inc. brochure, "Alginate products for scientific water control," Third edition, 14 pages, (Apr. 1987).

*Primary Examiner*—Richard D. Lovering
*Assistant Examiner*—Daniel S. Metzmaier
*Attorney, Agent, or Firm*—Christensen, O'Connor, Johnson & Kindness

[57] ABSTRACT

A method for producing a highly loaded, aqueous suspension having a pourable viscosity and containing from 20 to 50 volume percent colloidal ceramic or metal particles. A biologically produced polymer dispersant having a high density of carboxyl functional groups and an average molecular weight of at least 1,000 is solubilized in water in a quantity of less than 1.0 percent dry weight basis of particles. The ceramic or metal particles are then introduced to the solution, and agitated to form a substantially nonagglomerated suspension. The polymer dispersant may be produced by a bacterium grown in situ with the particles. A biologically produced polymer gelling agent that is miscible with the polymer dispersant may be admixed into the suspension, which is then maintained in a nongelled state while being supplied to a mold. The suspension is then exposed to a gel-triggering condition to form a gelled, sinterable article.

2 Claims, 2 Drawing Sheets

PROCESS FOR SUSUPENSION OF CERAMIC OR METAL PARTICLES USING BIOLOGICALLY PRODUCED POLYMERS

Development of the invention described herein was funded at least in part by a grant No. AFOSR-88-0135 from the United States Air Force Office of Scientific Research. Thus, the United States Government may have an interest in the invention described herein.

This application is a continuation application based on prior application Ser. No. 07/699,970, filed on May 14, 1991 now abandoned.

FIELD OF THE INVENTION

The present invention relates to the processing of ceramic or metal particles, and more particularly, to the use of biologically produced polymers for the suspension of ceramic or metal particles, and still more particularly, to the use of a combination of biologically produced polymer dispersants and gelling agents for the processing of ceramic or metal particles to form sinterable articles.

BACKGROUND OF THE INVENTION

Processes have been developed for producing formed articles such as engine components and superconductive composites from powdered metals or powdered ceramics. One conventional process involves the compounding of fine ceramic or metal particles with a binder and a solvent carrier to form a self-supporting shaped article, referred to as a "green body." The green body is then heated in a controlled atmosphere to pyrolyze the solvent, binder, and any other additives present, and to sinter the particles together to form a highly dense, homogeneous fused product.

Typical binding agents used in such processes are paraffin waxes and polyethylene plastic, which are used with hydrocarbon-solvents, such as heptane, hexane, or decane. The paraffin wax or polyethylene binder typically comprises between 10 and 30 weight percent of the green body. When the presence of the hydrocarbon solvent is factored in, typically less than 40 percent of the weight of the green body is attributed to the ceramic or metal particles. The result is a green body that is prone to cracking and shrinking during pyrolysis. The finished product has a low density and may contain voids with attendant weak mechanical characteristics. As a result, the rate of rejection of parts produced by such methods is extremely high, on the order of 90%. Additionally, pyrolysis of the wax or polyethylene and the hydrocarbon solvents may result in the production of toxic by-products.

Another conventional type of method for producing articles involves the suspension of colloidal ceramic or metal particles in a liquid carrier containing a particle dispersant agent and a gelling agent. The suspension must have a low viscosity to enable introduction of the suspension into a mold. After introduction into the mold the suspension is caused to gel, forming a self-supporting article that is then pyrolyzed and sintered.

A long standing difficulty in working with submicron-sized ceramic particles in suspension processes is the tendency of the particles to aggregate within the carrier due to van der Waals attractive forces between the particles. Such aggregation or agglomeration of the suspension creates larger effective particle sizes and leaves undesired voids in the finished product, resulting in cracks or weak spots in the finished product. To avoid such defects, it is desirable to uniformly disperse the particles in the liquid carrier to form a nonagglomerated, stable suspension of densely packed particles, resulting in a high density, high strength finished product.

To this end, conventional dispersant systems have been developed that use polyelectrolyte dispersants to coat the particles, creating electrosteric interactions between the particles that counteract the attractive forces to disperse the particles. For example, dextran sulfate has been demonstrated as being a suitable dispersant for producing stable, highly loaded aqueous suspensions. G. L. Graff et al., *Processing of Ceramic Suspensions With Biopolymers* (ACS International Conf. Colloid and Surface Science, Seattle, Poster Presentation, 1989). Dextran sulfate systems overcome many of the problems of polyethylene and paraffin wax systems due to the relatively low volume percentage of dispersant required. However, dextran sulfate is not an ideal dispersant due to the incomplete removal of the sulfate functional groups during pyrolysis, resulting in a contaminated final product.

Other conventional polyelectrolyte dispersant systems have been developed that utilize synthetic polymer dispersants to produce aqueous suspensions of ceramics and metals. Examples of such synthetic polymer dispersant systems are offered by U.S. Pat. Nos. 4,816,182 and 4,904,411, both issued to Novich et al. Novich '182 discloses the use of acrylic acid-based polymers in a water carrier, and triethanolamine and carboxylic acid in an alcohol carrier, as suitable dispersants for ceramic and metallic colloidal particles to create highly solid-loaded pourable suspensions. Additionally, Novich '411 discloses the use of polyethylene imine-based polyelectrolytes as suitable dispersant agents. The conventional synthetic polymer-based dispersant systems disclosed by Novich '182 and '411 enable the production of high density ceramic and metallic parts, but have the drawback of toxicity of the polymer dispersants, the monomer precursors of the polymers, and the by-products of the pyrolysis process. The alcohol carrier-based nonpolymeric dispersant systems disclosed by Novich '182 are also unsuitable due to the cost and toxicity of the alcohol carrier.

Another example of a conventional synthetic polymer dispersant system is disclosed by U.S. Pat. No. 4,734,237 to Fanelli et al., in which a metallic or ceramic powder mixture is used in injection molding of high density parts. The mixture includes between 50 and 90% by weight ceramic or metal powder, a dispersant, a gel-forming material, and a solvent for the gel-forming material, typically water or alcohol. The gel-forming materials disclosed are agar and agar derivatives such as agarose and agaroids. Various synthetic dispersants are disclosed for use in the mixture, including Darvan C™, a vinylidine cyanide vinyl acetate copolymer. Several other dispersants, such as gum arabic, are stated to be unsuitable for use in the mixture due to the deleterious effect on the gel strength of the agar-type gel-forming material.

In addition to the toxicity of the dispersants used in synthetic polymer dispersant systems such as those disclosed by Fanelli et al., a significant limitation of such systems is the common phase incompatibility of the synthetic dispersants with biologically produced gelling agents. The synthetic dispersants, essentially derivatives of petroleum, are not miscible with the natural gelling agents, and tend to separate out within the mixture. Such systems have not been subject to widespread commercial adaptation because of this problem.

SUMMARY OF THE INVENTION

The present invention provides a method for preparing a highly loaded suspension of at least 20 volume percent colloidal ceramic or metal particles in water. A water soluble, biologically produced polymer dispersant having a high density of carboxyl functional groups and an average molecular weight of at least 1,000 is solubilized in water. The ceramic or metal particles are admixed into the solution, and the solution is then agitated to form a substantially nonagglomerated suspension having a pourable viscosity. The biologically produced polymer present in the suspension is less than 1 percent (dry weight basis of particles).

In a further aspect of the present invention, a method is provided for forming an article by first preparing a mixture of: colloidal metal or ceramic particles; water; a biologically produced polymer dispersant for dispersing the particles in the water to form a substantially nonagglomerated suspension; and a biologically produced polymer gelling agent that is miscible in water with the polymer dispersant. The mixture is maintained in an ungelled state and is supplied to a mold. The mixture is then exposed to a gel-triggering condition to transition the polymer gelling agent to form a gelled, sinterable article.

In a still further aspect of the present invention, a method for producing a pourable suspension of colloidal particles is presented, comprising admixing ceramic or metal particles into an aqueous nutrient solution, and inoculating the admixed solution with a bacterium capable of producing a polymer having a high density of charged functional groups. The inoculated solution is then incubated to enable the bacterium to produce a sufficient quantity of the polymer to disperse the particles, forming a substantially nonagglomerated suspension having a pourable viscosity. This method allows the polymer to bond directly to the particles as it is produced, eliminating the need to control the molecular weight of the polymer as closely as would otherwise be necessary. Under such conditions, the bacterium is not bound to the particles, and can be removed by washing. Further, a filter device can be utilized to separate the bacterial cells from the particles within the suspension, while permitting the polymer dispersant to migrate into the particles as the polymer is produced.

The biologically produced polymers used as dispersants in the present invention are nontoxic and are present in very small quantity, enabling the production of a highly dense, strong, uniform green body. The biologically produced polymers used are substantially oxidized upon sintering of the green body, and thus do not present a source of contaminants in the final sintered article. Both the biologically produced polymer dispersant and the biologically produced gelling agent are soluble in water, eliminating the need for hazardous solvents. Further, the dispersant and gelling agent are miscible with each other, eliminating the problem associated with phase separation within the suspension.

The invention is also directed to a suspension comprising: water; colloidal metal or ceramic particles; a water soluble, biologically produced polymer dispersant for dispersing the particles to form a substantially nonagglomerated suspension; and a water soluble biologically produced polymer gelling agent that is miscible with the polymer dispersant and is capable of transitioning from a nongelled state to a gelled state in response to a gel-triggering condition.

DETAILED DESCRIPTION OF THE PREFERRED EMBODIMENTS

Figure 1:
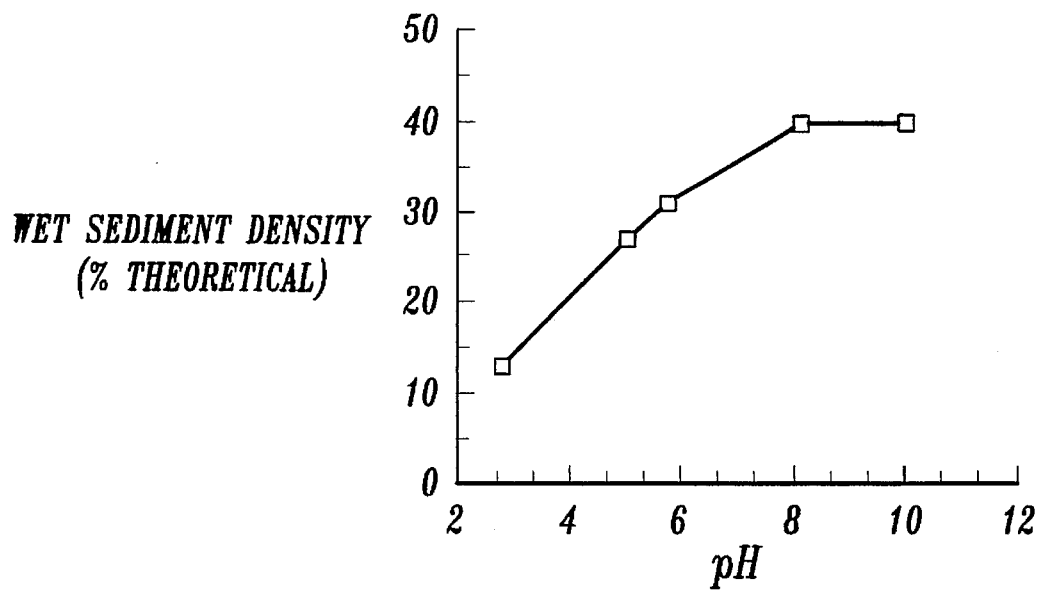
FIG. 1 is a graph showing wet sediment densities (expressed as percent of theoretical) of 2 volume percent aqueous suspensions of alumina containing 0.5% (dry weight basis alumina) alginate as a dispersant, as a function of the pH levels of the suspensions.

The present invention provides a method for preparing a highly loaded suspension of at least 20 volume percent colloidal ceramic or metal particles in water. A water soluble, biologically produced polymer dispersant having a high density of carboxyl functional groups and an average molecular weight of at least 1,000 is solubilized in water. The ceramic or metal particles are admixed into the solution, and the solution is then agitated to form a substantially nonagglomerated suspension having a pourable viscosity. The biologically produced polymer present in the suspension is preferably less than 1 percent (dry weight basis of particles).

In an additional aspect of the present invention, the biologically produced polymer dispersant can be grown in situ with ceramic or metal particles in a nutrient solution. A mixture of particles and nutrient solution is inoculated with a bacterium capable of producing a polymer dispersant. The suspension is then incubated to allow production of the polymer, resulting in the formation of a suspension.

In a further aspect of the present invention, a method is provided for forming an article by first preparing a mixture of: colloidal metal or ceramic particles; water; a biologically produced polymer dispersant for dispersing the particles in the water to form a substantially nonagglomerated suspension; and a biologically produced polymer gelling agent that is miscible in water with the polymer dispersant. The mixture is maintained in an ungelled state and is supplied to a mold. The mixture is then exposed to a gel-triggering condition to transition the polymer gelling agent to form a gelled, sinterable article. The method is particularly well suited for use in production of sintered or fused articles, however, it can also be used in other processes requiring suspensions of colloidal metal and ceramic particles.

As used herein, the term "metal" applies to elemental metals such as copper, aluminum, gold, silver, nickel, metal alloys such as steels, intermetallic components, and mixtures of any of the above. The term "ceramics" refers to a broad variety of ceramic materials including aluminum oxide (alumina), aluminum nitride, silica, silicone nitrides, silicone carbide, zirconia, dissociated zircon, yttria, barium titanate, diborides, beryllia, and mixtures thereof.

The size of particles that behave as colloidal particles, and thus that are suitable for processing using the present method, varies depending on the material. Generally, colloidal particles are less than 50 microns in diameter, and in most cases less than or equal to 5 microns in diameter. The method of the present invention is suitable for use with up to 50 micron colloidal particles, but more preferably for preparing suspensions of submicron-sized particles. The particles utilized in the various examples of the preferred embodiments of the present invention described herein comprise alumina particles with an average particle size (diameter) of 0.4 microns. However, it is to be understood that such alumina particles are described for purposes of example only, and that various other ceramic and metal particles, as described above, having differing size ranges, are equally well suited for use in the present invention.

The method of the present invention is directed to the suspension and related processing of the various colloidal particles described above in aqueous carriers through the use of biologically produced polymer dispersants and gelling agents. As used herein, the term "biologically produced" refers to naturally occurring polymers produced by biological organisms or enzymatic procedures, as well as to derivatives and chemically modified versions thereof. The biologically produced polymers used in the method of the present invention are naturally occurring, nontoxic polymers that are readily degraded by natural biological processes, and thus do not present environmental hazards.

The biologically produced polymer dispersants suitable for use with the present invention are polymeric polyelectrolytes, and more preferably are polymers having a high density of carboxyl functional groups. The term "high density of carboxyl functional groups" as used herein refers to the presence of at least one carboxyl group per oligomer, dimer, or monomer subunit of the polymer. Still more preferably, the polymer dispersants include at least one carboxyl group per dimer or monomer subunit, and most preferably having at least one carboxyl group per monomer subunit. Such high densities of carboxyl functional groups enables the preparation of highly loaded suspensions of submicron or larger colloidal particles with the use of polymer dispersant concentrations of less than 5 percent, and more preferably less than 1.0 percent (dry weight basis particles). Higher concentrations may be required for particles of less than a nanometer in diameter. The carboxyl groups of such polymers are completely oxidized upon sintering of formed articles made in accordance with the present invention, and therefore do not present a source of contaminants.

These preferred polymer dispersants have average molecular weights of less than 100,000 and greater than 1,000. More preferably, the average molecular weight of the dispersants is at least 3,000.

The process of the present invention can be used to create suspensions containing a quantity of ceramic or metal particles of at least 1% by volume. More preferably, the invention is well suited for preparing highly solids-loaded suspensions having at least 20% ceramic or metal particles by volume, and still more preferably for producing suspensions having at least 40% by volume ceramic or metal particles.

The suspensions prepared by the present method have a pourable viscosity to enable introduction of the suspension into a mold to produce a formed article. Thus the method is well suited for use in injection molding processes. As used herein, the term "pourable viscosity" refers to viscosities of less than 5,000 centipoise (cp), and more preferably to less than 1,000 cp, and still more preferably to less than about 500 cp, when measured at a shear rate of $9.2 \text{ s}^{-1}$. It should also be understood that suspensions of higher viscosity may be prepared in accordance with the present invention for molding under higher shear rates.

The biologically produced polymeric gelling agents suitable for use in the present invention are miscible in water with the biologically produced polymeric dispersants described above. The polymeric gelling agents are preferably selected from the group consisting of gel-forming polysaccharides, proteins, polypeptides and nucleic acids. More preferably, the polymer gelling agents contain a high density of carboxyl functional groups, as previously defined. The gelling agents of the present invention are capable of transitioning from an ungelled state to a gelled state in response to a gel-triggering condition.

PREPARATION OF SUSPENSIONS

To prepare a suspension in accordance with the present invention, a predetermined quantity of biologically produced polymer dispersant, selected from those to be subsequently described in detail, is solubilized in water. As used herein throughout, the term solubilized refers to making not only a true solution, but also less-than-true solutions in which the polymer is uniformly dispersed. The concentration of polymer is predetermined, in proportion to the weight of particles to be suspended in the solution, to fall within a preferred concentration range for the particular polymer utilized. The effect of polymer dispersant concentration on the viscosity and solids loading of the suspension will be described subsequently. A corresponding quantity of ceramic or metal particles is then admixed into the solution to provide the desired volumetric percent of particles.

The suspension is then preferably further agitated or mixed to enable the polymer dispersant to evenly disperse the particles. One method of dispersing the particles found suitable for the present invention involves a two-step mixing process. The suspension is first ultrasonicated for a predetermined period of time, such as 5 minutes, followed by mixing with a mixing device for an additional predetermined period of time, such as 30 minutes. For small laboratory batches, a magnetic stirrer may be used as the mixing device. For larger volumes of suspensions, various other commercial mixers, such as immersed agitators, can be used. It should be apparent that other mixing methods such as shaking or milling can be utilized in place of one or both mixing steps noted above.

The pH of the suspension is then checked and adjusted by the addition of an acid, base, or buffer to bring the suspension within a preferred pH range, described in greater detail below, to enhance the packing density of the particles within the suspension. The suspension is then ready for introduction to a mold, or for other additional processing.

It should also be apparent that as an alternate to first preparing a solution of a polymeric dispersant followed by the admixing of the particles, it would be possible to instead prepare a dry mixture of the solid particles, polymeric dispersant, and any other additives. This mixture is then added to water, followed by appropriate mixing to create the suspension.

PREFERRED BIOLOGICALLY PRODUCED POLYMER DISPERSANTS

The polymer dispersants found most suitable for use in the present method can be classified either as polysaccharides, and specifically polysaccharides containing a high density of uronic acid residues, or polypeptides, more specifically polypeptides composed of amino acids containing a high density of carboxyl functional groups. One example of a suitable polysaccharide is alginate, an acidic polysaccharide thought to be composed of blocks of polymannuronic acid, polyguluronic acid, and polymannuronic-guluronic acid. One source of alginate is from the marine alga, *Macrocystis pyrifera* (kelp). A similar alginate is also produced extracellularly by some bacteria, including *Azotobacter vinelandii* and various Pseudomonas species, such as *P. aeruginosa*. As used herein, "alginate" refers not only to native alginic acid but also alginate salts including calcium alginate, sodium alginate, potassium alginate, and other derivatives of alginic acid.

Kelp alginate is available commercially as sodium alginate, the sodium salt of the alginic acid polymer, and has an average molecular weight ranging from approximately 75,000 to 100,000. Kelp alginate aqueous suspensions of from 1 volume percent to 40 volume percent ceramic or metal particles can be prepared using between 0.2% and up to 1.0% sodium alginate on a dry weight basis (dwb) of particles. As used herein, dry weight basis of particles is computed by dividing the dry weight of polymer dispersant present in a suspension by the dry weight of the particles in the suspension, and then multiplying by 100. Alginate is not as suitable for the preparation of suspensions containing 50 volume percent or greater of particles, as the resulting suspension is too viscous for practical introduction into a mold.

In a further aspect of the present invention, native alginate may be partially hydrolyzed and then fractionally precipitated to obtain a polymannuronic acid-rich hydrolysis product fraction and a polyguluronic acid-rich hydrolysis product fraction. The polymannuronic and polyguluronic fractions each have lower average molecular weights than the native alginate precursor. These lower molecular weight alginate derivatives enable the production of more highly solids-loaded suspensions having a pourable viscosity. The polymannuronic acid-rich fraction has been found to have an average molecular weight of about 3,600. Aqueous suspensions containing from 1 to in excess of 40 volume percent particles can be produced by the present method using from greater than 0.25 to less than 1.0% (dwb particles) polymannuronic acid as a dispersant. These polymannuronic acid suspensions have viscosities of approximately one-fifth the viscosities of similarly loaded kelp alginate suspensions, as shall be subsequently described in greater detail by way of example.

The polyguluronic acid-rich hydrolysis product fraction of kelp alginate has been found to be even more preferable as a dispersant agent. The average molecular weight of the polyguluronic acid fraction has been found to be approximately 5,000, and more precisely to be greater than 4,800. Aqueous suspensions containing from 1 to in excess of 50 volume percent particles can be produced by the method of the present invention using from 0.2 to less than 1.0% (dwb particles) polyguluronic acid. These polyguluronic suspensions have viscosities of approximately one-hundredth the viscosities of similarly loaded kelp alginate suspensions. These polymannuronic and polyguluronic derivatives of alginate demonstrate that polymers having an average molecular weight of at least 3,000, and more preferably about 5,000, are preferred for use as dispersants in the present invention.

Table I contains a summary of selected wet sediment density data for aqueous solutions of 2 volume percent alumina particles using sodium alginate (kelp alginate) and the hydrolysis products thereof as dispersants, prepared in accordance with the previously described two step mixing process. This low volume percent of particles was used to determine the suitable range of polymer concentrations, and more particularly the preferred concentration value for enhancing the packing density of particles in the suspension. The results are applicable to more highly loaded suspensions, as will be shown by way of the examples discussed below, with high sediment densities correlating to suspensions that can be highly loaded with solids.

The 2 volume percent suspensions were prepared by making an aqueous solution of the polymer, admixing the alumina particles, sonicating the suspension for 5 minutes, and then mixing on a magnetic stirrer for 30 minutes. Although such suspensions are highly stable for processing, after several weeks the particles settle out to form a sediment. The wet sediment density was then determined as a percent of the theoretical density by dividing the theoretical volume of the sediment (completely packed) by the actual final volume of the sediment, and multiplying by 100.

TABLE I

| Polymer Dispersant Concentration | 2 Volume % Alumina Suspension Wet Sediment Density (% Theoretical) | | |
|---|---|---|---|
| (% Dry Weight Basis Alumina) | Sodium Alginate | Polymannuronic Acid | Polyguluronic Acid |
| 0 | 8 | — | — |
| 0.1 | 9 | — | — |
| 0.125 | 11 | — | — |
| 0.15 | 20 | — | — |
| 0.20 | 33 | — | — |
| 0.25 | 33 | 10 | 40 |
| 0.50 | 40 | 40 | 40 |
| 0.75 | 25 | — | — |
| 1.0 | 16 | 13 | 33 |

For sodium alginate, polymannuronic acid, and polyguluronic acid, the maximum packing density is obtained at a polymer concentration of about 0.5% (dwb alumina). Referring specifically to Table I for the sodium alginate data, the suspension is unstable in the absence of polymer, with particles agglomerating and settling into poorly packed structures. As polymer is added, the wet sediment density increases proportionally, although at concentration levels of less than 0.15% (dwb alumina) the suspension remains at least partially flocculated. At concentrations of polymer between 0.20 and 0.50% (dwb alumina), the suspension is well dispersed and stable. The maximum sediment density of 40% of theoretical was obtained for polymer concentrations of 0.5% (dwb alumina). At concentrations of polymer of 0.75% (dwb alumina) and greater, the suspension again becomes slightly flocculated and the wet sediment density decreases, indicating the surface of the alumina particles are already fully covered by polymer. Polymannuronic acid and polyguluronic acid behave similarly, with the maximum wet sediment density found at polymer dispersant concentrations of greater than 0.25, and preferably about 0.50% (dwb alumina).

While the polymannuronic acid and polyguluronic acid described herein and in the following examples were obtained by hydrolyzing native kelp alginate, polymannuronic acid and polyguluronic acid dispersants obtained from other sources should be equally suitable. Another suitable polysaccharide dispersant for use with the present invention is the polygalacturonic acid hydrolysis product of pectin.

In addition to polysaccharides, poly amino acids containing a high density of carboxyl groups are also suitable dispersants for use in preparing suspensions in accordance with the present invention. Included in this category are poly-D-glutamic acid, poly-L-glutamic acid, poly-($\alpha,\beta$)-DL-aspartic acid, and poly-L-aspartic acid. These polypeptides can be synthesized from the naturally occurring amino acid precursors. Table II presents wet sediment densities obtained from 2 volume percent alumina suspensions using the above polypeptides as dispersants. Again, alumina is provided as one example of a ceramic or metal particle suitable for use with the present invention, but is not intended to limit the scope of suitable particles. As can be seen from Table II, concentrations of from about 0.5 to about 5.0% (dwb alumina) of the polypeptides are suitable for producing aqueous suspensions of particles. The density values for the 0% controls vary due to differing amounts of settling time. The viscosity of highly loaded suspensions prepared with these biologically produced polymers will be described in greater detail in the forthcoming examples. The average molecular weight of the poly-D-glutamic acid described above has been found to range from 10,000 to 15,000.

TABLE II

| Polymer Dispersant Conc. (% Dry Weight Basis Alumina) | 2 Volume % Alumina Suspension Wet Sediment Density (% Theoretical) | | | |
| --- | --- | --- | --- | --- |
| | Poly-D-glutamic Acid | Poly-($\alpha,\beta$)-DL-aspartic Acid | Poly-L-glutamic Acid | Poly-L-aspartic Acid |
| 0 | 8 | 9 | 10 | 7 |
| 0.5 | 36 | 41 | 38 | 40 |
| 1.0 | 44 | 44 | 44 | 46 |
| 1.5 | 48 | — | — | — |
| 2.0 | 49 | — | — | — |
| 3.0 | 51 | — | — | — |
| 4.0 | — | 51 | — | 53 |
| 5.0 | 51 | — | — | — |
| 6.0 | 53 | — | — | — |

In addition to controlling the concentration of the polymers and selecting the proper molecular weight, the ability of the polymers used in accordance with the present invention to act as dispersants is affected by the pH of the solution. The surface charge of the particles can vary from being highly positive at low pH to negative at high pH, with the intermediate zero point of charge being most preferred. Further, the degree of ionization of the polymer dispersants is dependent on the pH. For alumina particles, by way of example, the zero point of charge is obtained at a pH of between 8 and 9, and more specifically at a pH of approximately 8.7. As an example of this behavior, the graph of FIG. 1 provides the wet sediment densities, as a percent of theoretical, of 2 volume percent aqueous suspensions of alumina containing 0.5% (dwb alumina) kelp alginate prepared at various pHs. The highest wet sediment densities were obtained at pH levels of at least 8, and more specifically between 8 and 9, and most preferably about 8.5 to 8.7. This same preferred pH range was also found for suspensions made using polymannuronic acid derivatives of alginates. For polyguluronic acid, the preferred pH range is between 4 and 6, and most preferably about 5. For the polypeptides described above, the preferred pH range is between about 6 and 7.

Figure 2:
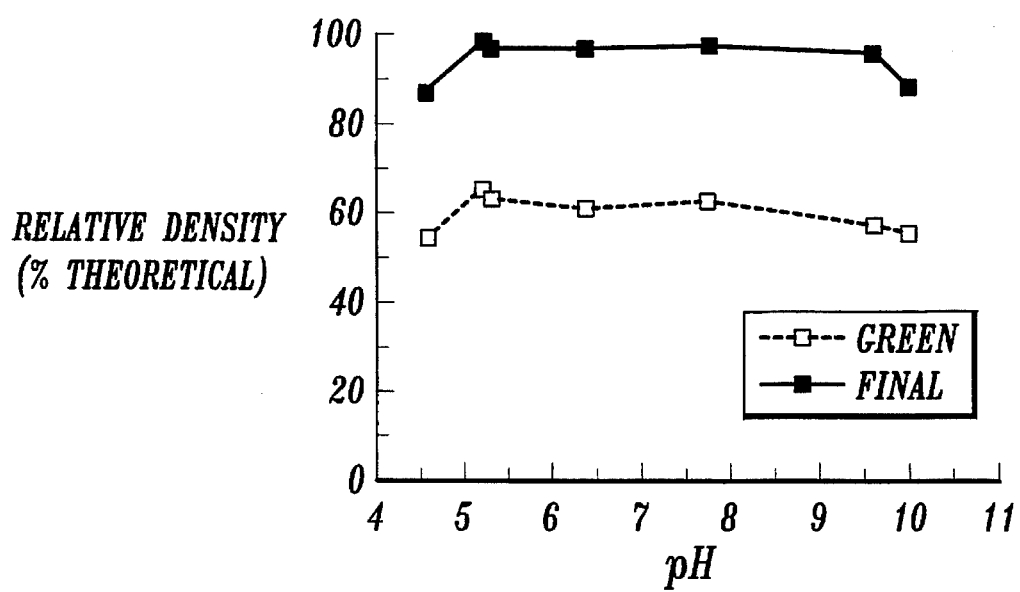
FIG. 2 is a graph showing the relative densities, expressed as a percent of theoretical, of sediment cakes from 40 to 50 volume % aqueous alumina suspensions, stabilized with polyguluronic acid as a dispersant, after drying to remove water (green density, open squares) and after pyrolysis at 1550° C. for one hour (final density, solid squares), as a function of pH of the suspension.

FIG. 2 provides another example of the impact of pH on the process of the present invention, as well as illustrating a further benefit of the present invention. FIG. 2 provides a graph of the relative densities of sediment compacts from aqueous alumina suspensions, stabilized with polyguluronic acid as the dispersant, as a function of the pH of the suspensions. The open squares represent relative densities, as a percent of theoretical, of the sediment compacts after drying to remove water. During the drying process, the sediment cake undergoes consolidation and densification due to a lubrication effect of the biologically produced polymer dispersant on the particles. The suspensions contained 50% by volume alumina in the pH 5 to 9.6 range, and 40% by volume alumina for the remainder. For pH 5 to 9.6, the dry density of the 50 volume % suspension compacts are about 60%. The solid squares show the final relative density, as a percent of theoretical, for the same sediment compacts after pyrolysis at 1550° C. for one hour. The density of these compacts was about 99% of theoretical for the samples prepared in the pH 5 to 9.6 range.

IN SITU SUSPENSION PREPARATION

Several of the biologically produced polymers suitable as dispersants for the method of the present invention can be produced by bacteria. As an example, alginates similar to kelp alginate can be produced by bacteria in the genus Azotobacter and the genus Pseudomonas. The alginate produced by the bacterium *Azotobacter vinelandii* has been found to produce alginate particularly well suited for the present invention. The bacterially produced alginate has been found as effective as kelp alginate in serving as a dispersant for particles in highly loaded suspensions. The preferred concentration of bacterially produced alginate in the aqueous solution is about 0.5%, which results in a wet sediment density of 40% of theoretical for a 2 volume percent alumina suspension prepared in accordance with the present invention.

Other bacteria are also capable of producing suitable polymers that can function as dispersants in accordance with the present invention. For example, the polypeptide poly-D-glutamic acid is produced by the bacterium *Bacillus licheniformis*. Table III provides a comparison of wet sediment densities, as a percent of theoretical, of 2 volume percent alumina suspensions in solutions of both the synthetically derived poly-D-glutamic acid and the bacterial derived poly-D-glutamic acid. The synthetic and the bacterially produced polypeptides provide similar results. In either case, the preferred concentration of the polypeptide is from at least 0.5 to about 5% (dwb alumina).

TABLE III

| Polymer Dispersant Concentration (% Dry Weight Basis Alumina) | 2 Volume % Alumina Suspension Wet Sediment Density (% Theoretical) | |
| --- | --- | --- |
| | Poly-D-glutamic Acid (Synthetic) | Poly-D-glutamic Acid (Bacterial) |
| 0 | 8 | 7 |
| 1.0 | 44 | 41 |
| 3.0 | 51 | 48 |
| 4.0 | — | 48 |

In a further aspect of the present invention, it has been found that polymer-producing bacteria can be grown in the presence of the particles admixed into an aqueous nutrient solution, such as Larsen's broth. Larsen's broth is a cell culture medium well known in the art, and comprises sucrose, $K_2HPO_4$, $MgSO_4 \cdot 7H_2O$, $FeSO_4 \cdot 7H_2O$, $Na_2MoO_4 \cdot 2H_2O$, $CaCl_2$, and sodium acetate in water. The nutrient solution-particle mixture is inoculated with a bacterium capable of producing a polymer having a high density of charged functional groups. For example, it has been found suitable to inoculate the mixture with $3.0 \times 10^3$ *A. vinelandii* cells per milliliter of nutrient solution. The inoculated solution is then incubated for a period of time to allow the cells to grow, and to allow production of the polymer. The time of incubation is typically from 4 to 5 days, and most preferably 4 days. The particle laden solution is preferably shaken or otherwise agitated during the incubation period to facilitate dispersion of the particles into a nonagglomerated suspension and to aerate the bacteria. The pH of the resulting suspension is then adjusted to the desired range for optimum dispersion of the particles.

*Azotobacter vinelandii* were grown in alumina suspensions having solid loadings of 5, 10, and 15 volume percent, prepared in accordance with the method described above. After 4 days of incubation, viable cells were produced at levels ranging from greater than $10^5$ to greater than $10^8$ cells per milliliter. The results indicate that the bacterium grows well in these alumina suspensions, although the yield of bacteria decreases with increasing volume percents of alumina. It has not been determined whether this trend is due to the pH effects of the alumina or to reduced oxygen concentrations. Therefore, controlling the pH during growth of the bacteria, or oxygenating the solution, may enable growth of the cells at still higher alumina concentrations.

Wet sediment tests were run for suspensions produced in accordance with the above method by growing *Azotobacter vinelandii* bacterium in situ with alumina particles. The height of sediment cakes that settled from the inoculated suspensions were compared to the height of sediment cakes that settled from sterile control suspensions with the same solids loading. The result for a 5 volume percent alumina suspension maintained at a pH of 7.6 was a cake height only 50% of the corresponding sterile control (i.e., twice as dense as the control). The result for a 10 volume percent suspension of alumina particles maintained at a pH of 8 was a cake height of 58% of the control.

One potential drawback of in situ processing of ceramic or metal suspensions using bacteria capable of producing suitable biological polymers is the deleterious effect of the cells on the quality of the final sintered article. It has been found that it is possible to wash the cells from the particles after growing the bacteria in situ with the particles, without resulting in the removal of the produced polymer, which has bonded to the particles.

The washing procedure involves centrifuging the suspension after incubation is complete. Centrifugation for 40 minutes at 22,000×g has been found suitable. The result of centrifugation is three layers: the polymer-coated ceramic particles, the bacterial cells, and the spent nutrient solution. The nutrient solution is then decanted from the particles and cell layers, after which the cell layer is scraped off of the particle layer. The surface of the particle is then preferably rinsed with distilled water. The washed ceramic particles are resuspended by admixing into water, followed by ultrasonicating and further mixing as required. This process may be repeated a number of times, such as 5 times. It has been found that this process is satisfactory in removing virtually all of the bacterial cells while retaining substantially all of the polymer that has bonded to the particles. For example, a suspension prepared by growing *A. vinelandii* bacteria in situ with alumina particles as described previously for 6 days at 30° C. results in on the order of $10^7$ bacterial cells per gram of particle. After 5 washing cycles as described above, the number of cells is reduced to about 85 cells per gram of particles.

Rather that removing the bacterial cells by washing, it is preferred to utilize a filter, such as a semipermeable membrane, to keep the bacterial cells separate from the particles during production of the polymer within the suspension. The membrane permits polymer to migrate through the membrane to the particles as it is produced, but prevents passage of the bacterial cells. The filter and cells are then removed from the suspension, leaving coated particles without cell contaminants.

An alternate method of in situ processing of suspensions in accordance with the present invention involves the use of nutrient-limited solutions. The nutrient-limited solutions of the present invention contain a carbon source allowing bacteria to produce polymer, but are limited in nitrogen and sulfur sources to limit growth of the bacterial population. It has also been found that the addition of a phosphate buffer to this nutrient-limited source enhances polymer production.

A predetermined quantity of bacterial cells is inoculated into a nutrient-limited aqueous solution into which ceramic or metal particles have been admixed. The inoculated, particle-laden solution is then incubated as described above for production of the polymer. The nutrient-limited solution enables the bacterial cells to produce polymer, while the proliferation of bacterial cells is prevented. The quantity of cells in the suspension produced thereby are thus greatly limited. The inoculated bacterial cells can, of course, be washed from the particles using the method previously described to remove even this small quantity of cells.

A preferred nutrient-limited medium solution for the present invention can be prepared by solubilizing into one liter of deionized water the following: 20 grams of mannitol or sucrose as a carbon source; 65 milligrams of $K_2HPO_4$; 40 milligrams of $MgSO_4 \cdot 7H_2O$; and 1.7 milligrams of $FeCl_2 \cdot 4H_2O$. It has been found that inoculation of *A. vinelandii* cells into this nutrient-limited solution, using manitol as the carbon source, to a concentration of $2.8 \times 10^5$ cells per milliliter, followed by incubation for a period of 96 hours, results in alginate production of 30.5 micrograms per ml, or 100 micrograms per 1,000 cells. The alginate produced by a single bacterial cell in this medium can coat up to approximately 230,000 alumina particles having a diameter of 0.4 microns.

Additional or alternate carbon sources can be used in a nutrient-limited solution such as that described above, which is provided as illustrative of one preferred embodiment of a nutrient-limited solution only. For example, sodium acetate can be added to the nutrient-limited solution above to allow slightly enhanced production of polymer, although this results in some cell population growth.

PREPARATION OF GELABLE SUSPENSIONS

In a further aspect of the present invention, a method is provided for producing a gelable suspension of metallic or ceramic particles, as defined above, by utilizing both a biologically produced polymer dispersant to disperse the particles to form a substantially nonagglomerated suspension, and a biologically produced polymer gelling agent to enable gelling of the suspension, after the suspension is supplied to a mold, to form a gelled, sinterable or fusable article. The biologically produced polymer dispersant and the biologically produced polymer gelling agent are both soluble or dispersable in an aqueous carrier, and are miscible with each other, enabling the production of a uniform, consistent and stable suspension. In addition, due to the compatibility of the dispersant and gelling agent polymers of the present invention, the gel strength of the gelling agent is not substantially reduced by the dispersant.

A suspension is first prepared in accordance with the previously described method. An effective amount of a biologically produced polymer dispersant is solubilized to form an aqueous solution. The effective amount of polymer dispersant is determined in proportion to the amount of particles that are to be suspended in the suspension. Colloidal ceramic or metal particles are then admixed into the solution, and agitated to evenly disperse the particles, forming a substantially nonagglomerated suspension. A biologically produced polymer gelling agent that is miscible in water with the polymer dispersant is then admixed into the suspension. The suspension is maintained under conditions assuring that the gelling agent remains in a nongelled state, and is supplied to a mold. The suspension is then exposed to a gel-triggering condition, to transition the polymer gelling agent to the gelled state, forming a gelled, sinterable article.

While it is preferred to disperse the particles to form a suspension prior to addition of the gelling agent to ensure uniform dispersion, it should be apparent that it would be possible to add the colloidal particles, polymer dispersant, and polymer gelling agent at one time to water, followed by mixing, to prepare the gelable suspension. This alternate process variation would be most suitable for gelling agents that have a low viscosity when maintained under nongelling conditions. Such is the case for many temperature-dependent gelling agents that are maintained at temperatures above the gel transition temperature.

The polymer dispersants suitable for use in this aspect of the present invention include all of the biologically produced polymer dispersants previously described for use in preparing suspensions. Specifically, these include biologically produced polymers having a high density, of carboxyl groups. In addition, biologically produced polymers having a high density of other charged functional groups, such as other acid groups or basic groups, are suitable for use in preparing gelable suspensions in accordance with this aspect of the present invention. For example, biologically produced polymers that contain sulphate groups, such as dextran sulfate, or amine groups are suitable for use. However, as noted previously, sulphate-containing polymers such as dextran sulphate are less desirable for this purpose due to the residual contaminant left after pyrolysis of the formed article.

The gelling agents used in the present invention, and the mechanisms which cause them to gel, are well known in the art. However, the combination of the biologically produced gelling agents and compatible biologically produced dispersant agents is novel and represents a substantial improvement over prior art methods. Biologically produced polymer gelling agents suitable for use with the present invention include gel-forming polysaccharides, gel-forming proteins, gel-forming polypeptides, and gel-forming nucleic acids. In particular, biologically produced polymers containing a high density of acidic functional groups, such as the carboxyl functional group of uronic acid-containing polymers and polyamino acids, are well suited for use with the biologically produced polymer dispersants containing a high density of acidic functional groups. Such gelling agents generally have an average molecular weight of at least 50,000, and preferably greater than or equal to 100,000, and still more preferably greater than or equal to 1,000,000.

Examples of suitable polysaccharide gelling agents are agar and derivatives of agar, such as agarose. Additionally, alginates such as those described previously are suitable for use as gelling agents due to the relatively high molecular weight (typically in the range of 75,000 to 100,000 or higher) if present at sufficiently high concentration levels. A further example is the heteropolysaccharide sold commercially under the trade name GELRITE™, by Kelco, a division of Merck and Company, Inc., San Diego, Calif. GELRITE™ is described by the manufacturer as a polysaccharide comprising one glucuronic acid residue, one rhamnose residue, and two glucose residues per subunit. Still further examples are pectin and pectin derivates, such as the polygalacturonic hydrolysis product of pectin. Each of these polysaccharides is capable of forming a gel when introduced to aqueous systems at a sufficiently high concentration and under the proper temperature and cationic solution strength.

An example of a suitable protein gelling agent is gelatin, a collagen derivative, which is particularly well suited for use with the polyglutamic acid and polyaspartic acid polypeptides dispersants described previously.

An example of a suitable polypeptide gelling agent is polyglutamic acid when present at sufficiently high concentration levels and produced with sufficiently high molecular weights. An example of a suitable nucleic acid gelling acid is believed to be DNA, especially bacterial or yeast DNA, or DNA from other microbial sources.

The suitable gelling agents for use in the present invention are capable of forming a gel in response to a gel-triggering condition, such as temperature, shear rate or cationic solution strength. For example, agarose has a gel-phase transition temperature of between 30° C. and 45° C. and can be utilized as a gelling agent in the present invention. Agarose is particularly well suited for use with a suspension prepared using alginate, polyguluronic acid or polymannuronic acid as a dispersant. Agarose is introduced to a suspension that has been prepared as described previously, and that is maintained at a temperature above 45° C., such as from 50° C. to 60° C. The agarose-containing suspension is then thoroughly mixed while being maintained at this high temperature. The suspension is then supplied to a mold, such as by injection through an orifice. The mold typically is maintained at a temperature below the gel-phase transition temperature, such as between 20° C. and 30° C. The suspension is thus cooled by the mold to a point below the phase transition temperature to form a gelled sinterable article that may be removed from the mold as a self-supporting shape.

A further example of a temperature dependent gelling agent is the previously described heteropolysaccharide GELRITE™, which has a gel-setting temperature ranging from 35° C. to greater than 50° C. at a concentration of 1% (by weight of aqueous solution). The exact gel-setting temperature varies as a function of cation concentration in the suspension, including the concentration of magnesium, calcium, sodium and potassium. A process utilizing GELRITE™ as the gelling agent would be the same as that described previously for agarose, with the temperatures being adjusted accordingly.

Other gelling agents can be transitioned from a gelled to a nongelled state by adjusting the cationic strength of the suspension. One example of such a gelling agent is the heteropolysaccharide GELRITE™. A suspension would be prepared as described above using GELRITE™ in combination with a compatible dispersant, or with GELRITE™ alone serving as both the dispersant and gelling agent. The suspension is maintained in an ungelled state by controlling the cationic strength at a level below that required to form a gel. Magnesium, calcium, sodium or potassium salts can then be added to the suspension, during or after introduction of the suspension into a mold, to raise the cation concentration above the point required to form a gel.

Figure 3:
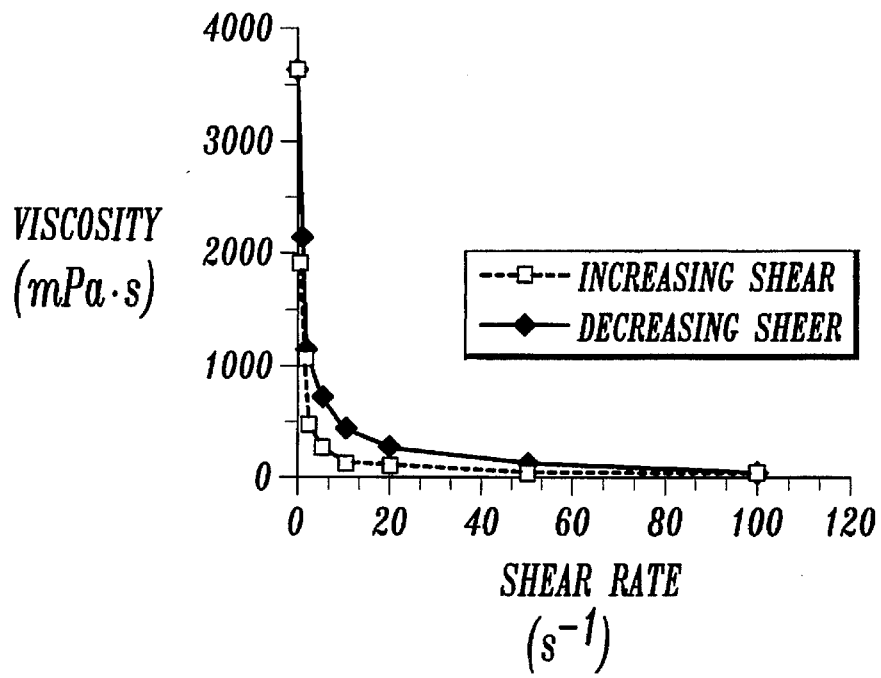
FIG. 3 is a graph showing the viscosity (in mPa·s (centipoise)) of a 30 volume percent aqueous alumina suspension containing 0.5% (dry weight basis alumina) of alginate as a function of increasing (solid squares) and decreasing (open squares) shear rate (in $s^{-1}$)
Figure 4:
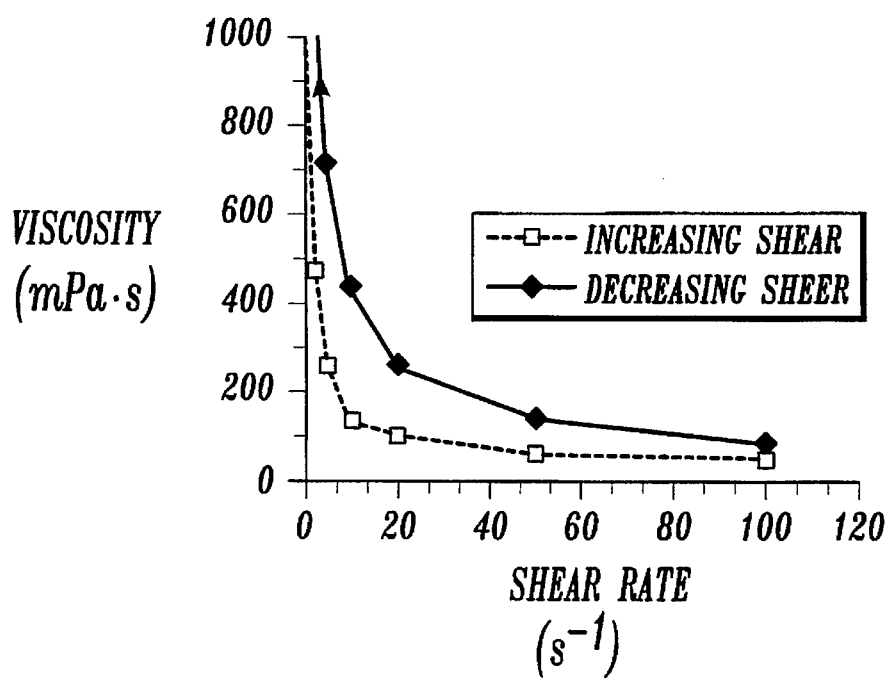
FIG. 4 is a graph corresponding to that of FIG. 3, but for a 40 volume percent alumina suspension.

A further example of a gel-transitioning trigger is the use of shear rate for gelling agents that display thixotropic behavior. An example of such a biologically produced polymer is kelp alginate. FIGS. 3 and 4 provide graphs of the viscosity of 30 volume percent and 40 volume percent, respectively, suspensions of alumina in 0.5% (dwb alumina) aqueous solutions of alginate at various shear rates. The viscosity of each suspension was first measured while the applied shear rate was increased from 0 to 100 s$^{-1}$, followed by remeasurement as the shear rate was decreased over the same range. Some hysteresis was evidenced, as seen in FIGS. 3 and 4. As can be seen from FIGS. 3 and 4, the viscosity of the alginate suspensions is heavily dependent on shear rate. For the 40 volume percent alumina suspension of FIG. 4, the viscosity ranges from a high of greater than approximately 500 cp (mPa·s) at a shear rate of less than 10 s$^{-1}$ to a low of approximately 100 cp at shear rates of at or above 100 s$^{-1}$. The arrow in FIG. 4 represents an off-graph value of 10,500 cp at a shear rate of 0.5 s$^{-1}$.

Thus, a suspension of ceramic or metal particles can be prepared in accordance with the present invention using a suitable biologically produced dispersant having a low average molecular weight (preferably less than 10,000), such as the polygalacturonic acid-rich or polymannuronic acid-rich hydrolysis products of alginate. The higher molecular weight sodium alginate would then be added to the suspension as a gelling agent. The suspension containing this alginate gelling agent would then be maintained under a high shear rate to prevent gelling. This high shear rate would be maintained during injection into a mold by controlling the speed of injection and orifice diameter. Once in the mold and no longer subject to the shear rate, the alginate would transition to the gelled state to form a gelled sinterable article. Alternatively, a gelable suspension can be produced using alginate as both the dispersant and the gelling agent. Thus, the suspension would be produced by admixing particles into an aqueous solution of the alginate maintained at a suitable shear rate to prevent gelling. The suspension would then be maintained at this shear rate during introduction into the mold, after which it would gel.

EXAMPLES

The following examples are included to assist one of ordinary skill in making and using the invention. They are intended as representative examples of the present invention and are not intended in any way to limit the scope of this disclosure or the scope of protection granted by Letters Patent hereon. Commercial sources for ceramic particles and biologically produced polymers are provided as illustrations of suitable materials, and are also not intended to limit the scope of the invention to utilization of materials only from those sources. Table IV, following the examples, summarizes the viscosities of various aqueous suspensions of alumina prepared in accordance with the present invention, and may be referred to for convenience as an aid to understanding the examples.

EXAMPLE 1

An aqueous suspension of powdered alumina with an average particle size of 0.4 microns, available as item No. AKP-30, Sumitomo Chemical America, Inc., New York, N.Y., was prepared in accordance with the present invention. The polymer dispersant used was kelp-produced sodium alginate having a molecular weight of 75,000 to 100,000, sold by Sigma Chemical Company, St. Louis, Mo. The alginate was solubilized in water to a concentration of 0.5% (dwb alumina). Two different suspensions were prepared using this solution by admixing sufficient quantities of alumina particles to levels of 30 and 40 volume percent alumina. The suspensions were then ultrasonicated for 5 minutes, followed by mixing with a magnetic stirrer for 30 minutes. The pH of each suspension was then adjusted to approximately 8.0.

The viscosities of the suspensions were measured using the method described in Cesarano, J., III, and I. A. Aksay, *Processing of Highly Concentrated Alumina Suspensions Stabilized With Polyelectrolytes*, J. Am. Ceram. Soc. 71 [12]:1062–67 (1988) using a digital viscometer. The 30 volume percent suspension was found to have a viscosity varying from 140 to 445 centipoise, while the 40 volume percent suspension had a viscosity ranging from 2,460 to 3,720 centipoise. The alumina in both of these suspensions was substantially nonagglomerated and well dispersed. An attempted 50 volume percent alumina suspension was too viscous to be prepared.

EXAMPLE 2

Low molecular weight alginate fractions were prepared using the sodium alginate described in Example 1. The sodium alginate was hydrolyzed in 0.1 Normal hydrochloric acid under reflux for 4 hours. The solution was centrifuged, after which the pellet layer was dissolved using sodium hydroxide. A polyguluronic acid-rich fraction was obtained by lowering the pH to 2.4 and collecting the precipitate. A polymannuronic acid-rich fraction was obtained by further lowering the pH to 1.3 and collecting the precipitate.

The polymannuronic acid-rich fraction of the hydrolysis product was found to have an average molecular weight of approximately 3,600. Suspensions containing 30 and 40 volume percent alumina were then prepared according to the method of Example 1, but using polymannuronic acid as the dispersant. Viscosities of these suspensions were measured using the method of Example 1. The 30 volume percent alumina suspension was found to have a viscosity of 95 centipoise, while the 40 volume percent suspension was found to have a viscosity of 465 centipoise. Both suspensions were well dispersed and substantially nonagglomerated. A 50 volume percent alumina suspension using the polymannuronic acid was attempted, but was too viscous to be prepared.

The polyguluronic acid-rich fraction of the hydrolysis product was found to have an average molecular weight of greater than 4,800, and more specifically of approximately 5,000. Three suspensions of 30, 40, and 50 volume percent alumina were prepared using the method of Example 1 with polyguluronic acid as the dispersant. The pH of the suspension was adjusted to 8, as in Example 1. The 30 and 40 volume percent suspensions had viscosities of 40 and 230 centipoise, respectively, and were well dispersed and substantially nonagglomerated. The 50 volume percent suspension had a viscosity ranging from 470 to 625, but was slightly flocculated.

Three additional suspensions of 30, 40, and 50 volume percent alumina using polyguluronic acid as a dispersant were prepared according to the method of Example 1, except that the pH was adjusted to about 5.0. The viscosities of the 30 and 40 volume percent suspensions was found to be less than 20, and 35, respectively, with both suspensions being well dispersed and substantially nonagglomerated. The 50 volume percent suspension had a viscosity of about 110 centipoise, but was slightly flocculated.

EXAMPLE 3

A series of suspensions was prepared in accordance with the method of Example 1, but using the synthesized poly- D-glutamic acid polypeptide as a dispersant. The synthesized polypeptide was obtained from Sigma Chemical Company, St. Louis, Mo., and was found to have an average molecular weight of between 10,600 and 13,600. The pH of the suspension was adjusted to about 6.0 in each case.

Three suspensions were prepared for 30, 40, and 50 volume percent alumina in an aqueous solution of the synthesized polypeptide at a concentration of 0.5% (dwb alumina) synthetic polypeptide. The viscosities of the 30 and 40 volume percent suspensions were found to be 5 and 105 centipoise, respectively. The viscosity of the 50 volume percent suspension was found to range from 1,115 to 2,195. All suspensions were well dispersed and substantially nonagglomerated.

Two additional suspensions were prepared containing 30 volume percent alumina in aqueous solutions of 1.0 and 3.0% (dwb alumina) synthesized polypeptide. The 1.0% and 3.0% suspensions were found to have viscosities of 135 and 430, respectively. Both suspensions were well dispersed and substantially nonagglomerated.

EXAMPLE 4

A 30 volume percent alumina suspension was prepared in accordance with the method of Example 1, but using the polypeptide poly-D-glutamic acid produced by the bacterium *Bacillus licheniformis*. The exact average molecular weight of the poly-D-glutamic acid produced by this bacterium is not known precisely, but is estimated be in the range of 500,000 to $10^6$. The pH of the suspension was adjusted to about 6.0. This suspension was found to have a viscosity ranging from 115 to 230 centipoise, and was well dispersed and substantially nonagglomerated, though somewhat unstable.

EXAMPLE 5

An aqueous solution was prepared using the sodium alginate dispersant of Example 1 and agarose, a gelling agent. The agarose and alginate were found to be very compatible, and miscible in water.

TABLE IV

Viscosities of Aqueous Alumina Suspensions at a Shear Rate of $9.3s^{-1}$

| Dispersant Polymer | pH | Viscosity (cp) 30 vol % $Al_2O_3$ | 40 vol % $Al_2O_3$ | 50 vol % $Al_2O_3$ |
|---|---|---|---|---|
| Polyguluronic Acid (0.5% dwb $Al_2O_3$, MW 5,000) | 8 | 40 | 230 | 470–625 (slightly flocculated) |
| Polyguluronic Acid (0.5% dwb $Al_2O_3$, MW 5,000) | 5 | <20 | 35 | 110 (slightly flocculated) |
| Polymannuronic Acid (0.5% dwb $Al_2O_3$, MW 3,600) | 8 | 95 | 465 | Too viscous to be prepared |
| Sodium Alginate (kelp) (0.5% dwb $Al_2O_3$, MW 75,000–100,000) | 8 | 140–445 | 2460–3720 | Too viscous to be prepared |
| Poly-D-glutamic Acid (synthesized, MW 10,000–14,000) 0.5% dwb $Al_2O_3$, 1.0% dwb $Al_2O_3$, 3.0% dwb $Al_2O_3$, | 6 | 5 135 430 | 105 — — | 1115–2195 — — |
| Poly-D-glutamic Acid (Bacterial, 1.0% dwb $Al_2O_3$, MW approx. $5 \times 10^5–10^6$) | 6 | 115–230 | — | — |

The present invention has been described in relation to a preferred embodiment thereof and several alternatives thereto. One of ordinary skill, after reading the foregoing specification, will be able to effect various changes, substitutions of equivalents, and other alterations without departing from the broad concepts disclosed herein. It is therefore intended that the scope of Letters Patent granted hereon be limited only by the definitions contained in the appended claims and equivalents thereof.

The embodiments of the invention in which an exclusive property or privilege is claimed are defined as follows:

1. A gelable suspension comprising:

colloidal particles selected from the group consisting of ceramic particles and metal particles; water;

an effective amount of a biologically produced polymer dispersant having a molecular weight of at least 1,000 to 5,000 to disperse the colloidal particles in the water and form a substantially nonagglomerated suspension having a pourable viscosity, wherein the polymer dispersant is selected from the group consisting of the polymannuronic acid-rich hydrolysis product of an alginate, the polyguluronic acid-rich hydrolysis product of an alginate, poly-D-glutamic acid, poly-L-glutamic acid, poly-(a,b)-DL-aspartic acid, poly-L-aspartic acid, pectin, and mixtures thereof; and a biologically produced polymer gelling agent having a molecular weight of at least 50,000 that is miscible in water with the polymer dispersant and is capable of transitioning from a nongelled state to a gelled state.

2. The suspension of claim 1, wherein the suspension contains at least 50 volume percent colloidal particles.

\* \* \* \* \*